United States Patent
Lin et al.

(10) Patent No.: US 6,212,324 B1
(45) Date of Patent: Apr. 3, 2001

(54) HOLDER FOR SINGLE HEAD FIBER OPTIC CONNECTORS

(75) Inventors: Samuel I-En Lin, Miao-Li Hsien; L. H. Lin, Chilung, both of (TW)

(73) Assignee: UCONN Technology Inc. (TW)

( * ) Notice: Subject to any disclaimer, the term of this patent is extended or adjusted under 35 U.S.C. 154(b) by 0 days.

(21) Appl. No.: 09/103,587

(22) Filed: Jun. 24, 1998

(30) Foreign Application Priority Data

Sep. 15, 1997 (TW) .................................. 86215799

(51) Int. Cl.⁷ ....................................................... G02B 6/36
(52) U.S. Cl. ............................................................ 385/136
(58) Field of Search .................................. 385/136, 137, 385/139, 53, 55, 70, 76, 77, 88, 89, 92, 94, 15, 52–56, 58, 60, 62, 66, 68–72, 75–78, 81, 84, 85, 93, 135; 248/65, 67.7; 174/40 CC; 104/200

(56) References Cited

U.S. PATENT DOCUMENTS

| | | | |
|---|---|---|---|
| 4,679,869 | * 7/1987 | Watson | 439/78 |
| 4,953,929 | * 9/1990 | Basista et al. | 350/96.2 |
| 5,259,052 | * 11/1993 | Briggs et al. | 385/78 |
| 5,398,295 | * 3/1995 | Chang et al. | 385/58 |
| 5,452,388 | * 9/1995 | Rittle et al. | 385/92 |
| 5,475,781 | * 12/1995 | Chang et al. | 385/76 |
| 5,528,712 | 6/1996 | Belenkiy et al. | 385/78 |
| 5,588,079 | * 12/1996 | Tanabe et al. | 385/78 |
| 5,675,682 | * 10/1997 | De Marchi | 385/77 |

* cited by examiner

Primary Examiner—John D. Lee
Assistant Examiner—Michelle R. Connelly-Cushua
(74) Attorney, Agent, or Firm—Michael D. Bednarek; Shaw Pittman

(57) ABSTRACT

A holder for single head fiber optic connectors comprises a body and a pair of arms. The body has a guarding portion. The arms extend from the body so as to form a pair of receiving spaces between the body and the arms. The single head fiber optic connectors are held in the receiving spaces by the arms and the guarding portion.

2 Claims, 4 Drawing Sheets

HOLDER FOR SINGLE HEAD FIBER OPTIC CONNECTORS

BACKGROUND OF THE INVENTION

1. Field of the Invention

The present invention relates in general to a holder for single head fiber optic connectors.

2. Description of the Related Art

Currently there is a tendency to replace conventional copper cables with fiber-optic cables. And a great quantity of fiber optic connectors is used therein to build networks. In so called SC system, single head fiber optic connectors are provided in pairs for use. Taiwanese Patent No. 261245 thus discloses a holder for simultaneously holding a pair of connectors. The holder consists of an upper half-housing and a lower half-housing. However, assembling the two half-housings requires additional manual labor. Moreover, the connectors are held too tight so that they cannot be geo-metrically adjusted to accurately align with other connectors while splicing.

U.S. Pat. No. 5,528,712 discloses an integral boot structure for simultaneously holding two connectors. There is no need to assemble the boot structure. Also, the connectors held by the boot structure can be geometrically adjusted while splicing. Therefore, the above-mentioned problems can be solved. However, the boot structure and the connectors are formed together in the factories. The users cannot separate them. As a result, the connectors in the boot structure cannot be replaced with new ones when they are out of order. Furthermore, the specifications of the connectors recited in U.S. Pat. No. 5,528,712 are different from normal specifications. That is inconvenient to the users.

SUMMARY OF THE INVENTION

An object of the present invention is to provide a holder for single head fiber optic connectors, which solves the above-mentioned problems.

In accordance with the object of the present invention, a holder for single head fiber optic connectors is provided that comprises a body and a pair of arms. The body has a guarding portion. The arms extend from the body so as to form a pair of receiving spaces between the body and the arms. The single head fiber optic connectors are held in the receiving spaces by the arms and the guarding portion.

The body and the arms are integrally formed. In other words, there is no need to assemble the holder. This can save a large quantity of manual labor.

The holder of the present invention holds the connectors mainly in the lateral directions that differs from the holders of other prior arts in the directions of the top and bottom, so the connectors can be geometrically adjusted to accurately align with other connectors while splicing. Furthermore, the holder of the present invention is adapted for the connectors of normal specifications, and therefore is greatly advantageous in universality, circulation and commercial competition.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
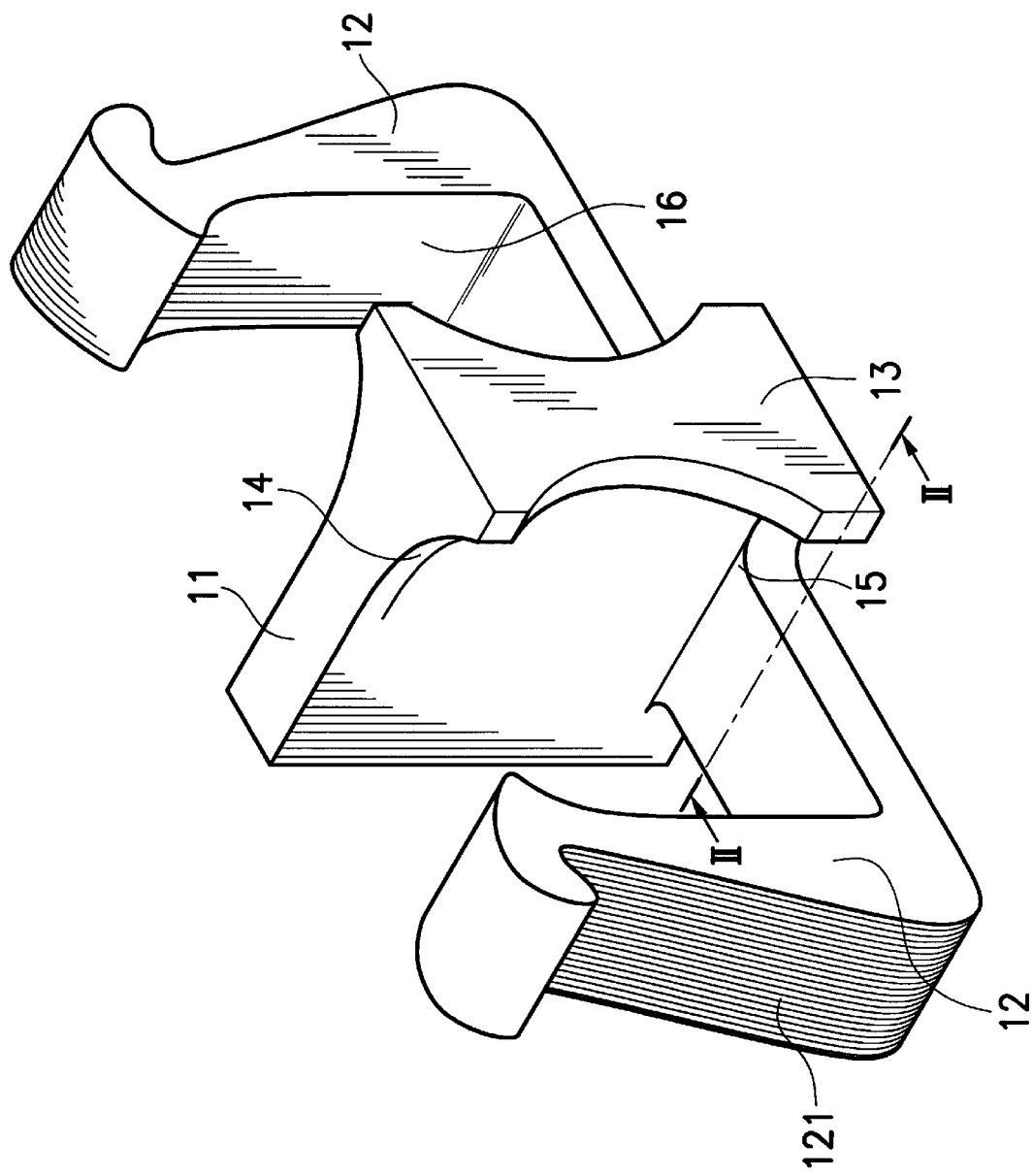
FIG. 1 is a perspective diagram of a holder for single head fiber optic connectors according to a first embodiment of the present invention.

FIG. 1 shows the first embodiment of the present invention, in which a holder for single head fiber optic connectors has a body 11 and a pair of arms 12. The arms 12 extend up to form receiving spaces 16 for holding single head fiber optic connectors. Also, the arms 12 have rough outer surfaces 121 (e.g. ridges or the like) to facilitate gripping the holder by the user when he tries to separate the connectors and the holder.

Figure 2:
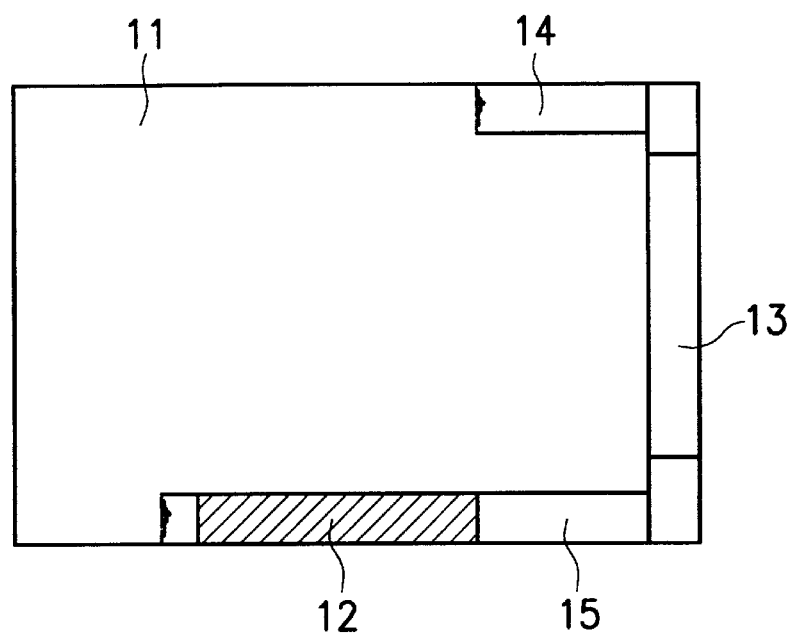
FIG. 2 is a sectional side view of FIG. 1 along line II—II.

As shown in FIGS. 1 and 2, the body 11 has an I-shaped guarding portion 13 and arcuate flanges 14, 15. The upper flanges 14 extend from the body 11 to the guarding portion 13, while the lower flanges 15 extend from the guarding portion 13 to the arms 12.

Figure 3:
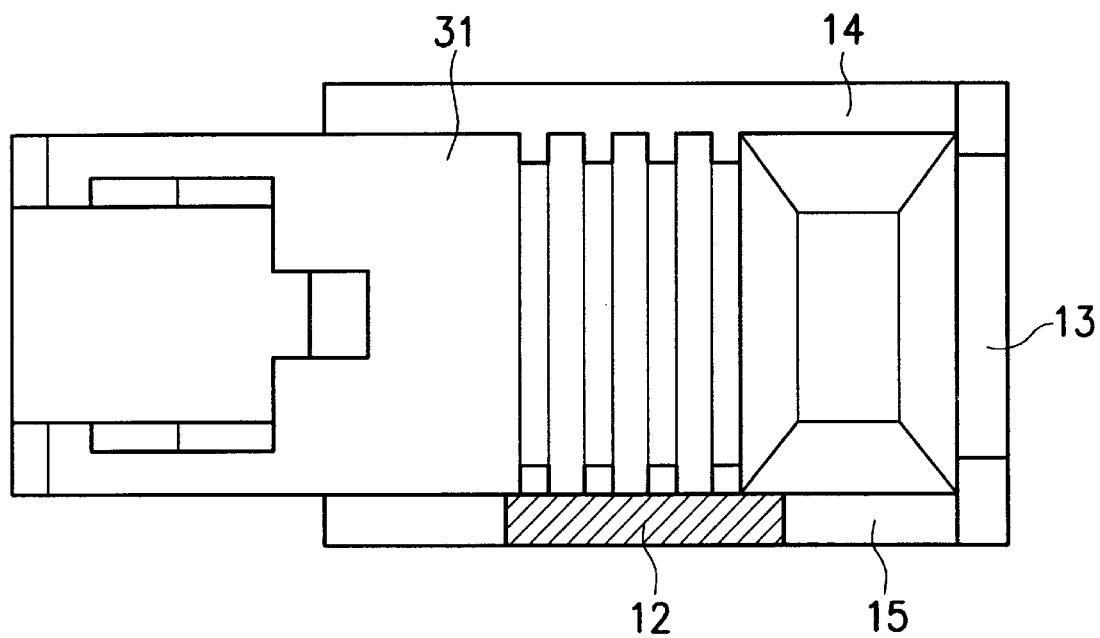
FIG. 3 is a side view according to FIG. 2 with single head fiber optic connectors held by the holder.

The holder of the present invention is used for simultaneously holding two single head fiber optic connectors. Then, it is fine to splice the two connectors and other connectors. As shown in FIGS. 1–3, the single head fiber optic connectors 31 are surrounded by the upper flanges 14, the body 11, the lower flanges 15, the arms 12 and the guarding portion 13. The connectors 31 are mainly held in the lateral directions by the arms 12 and the body 11, which is different from being held in the directions of the top and bottom in other prior arts. The extending arms 12 of the present invention can be deformed in the lateral directions. Therefore, it is possible to geometrically adjust the connectors so as to align with other connectors. Also, the upper and lower flanges 14, 15 are auxiliaries to hold the connectors 31 from the top and bottom. Therefore, the connectors can be held firmly.

Figure 4:
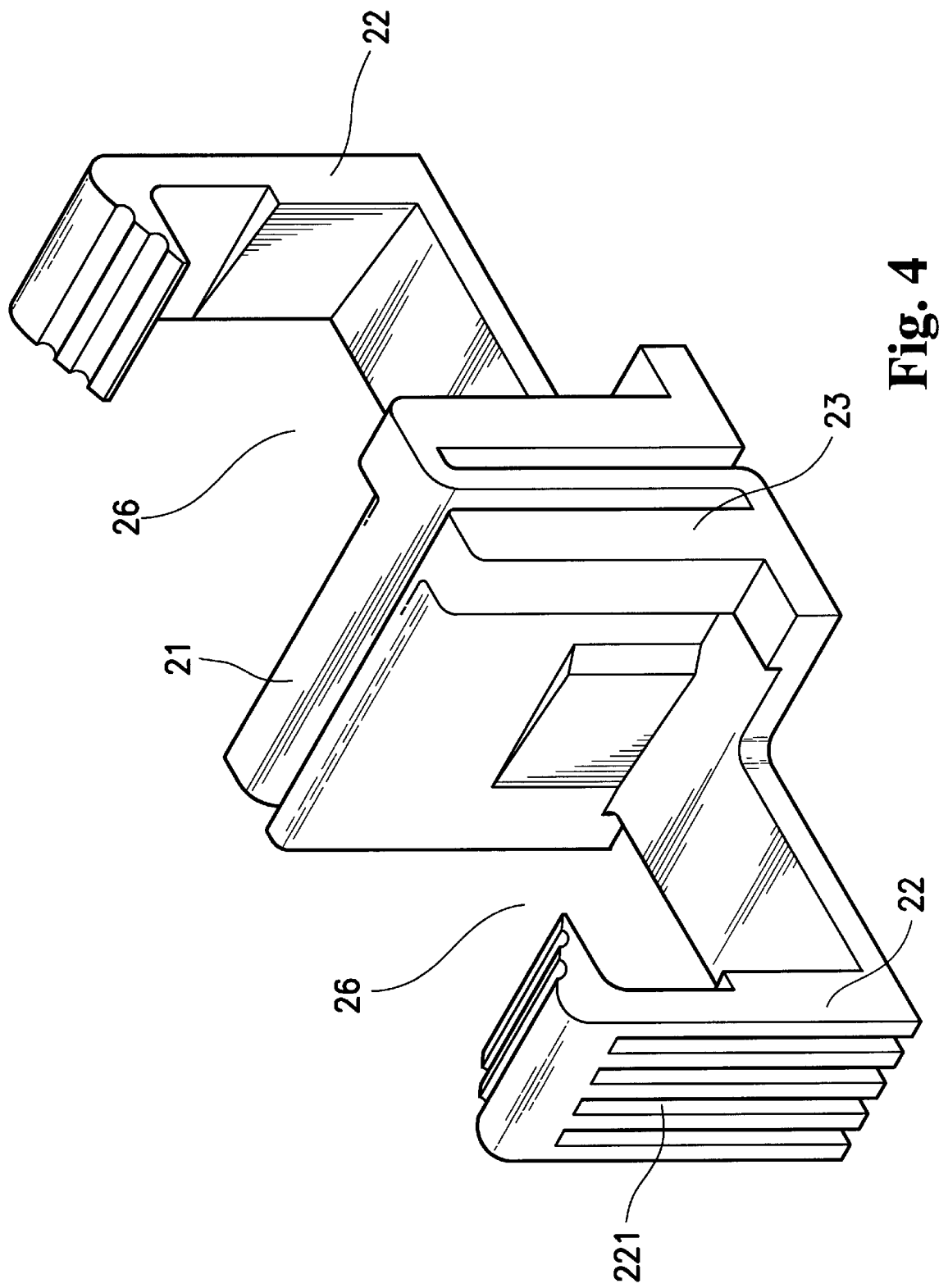
FIG. 4 is a perspective diagram of a holder for single head fiber optic connectors according to a second embodiment of the present invention.

Now referring to FIG. 4, a holder of the second embodiment of the present invention has a body 21 and a pair of arms 22. The arms 22 extend up to form receiving spaces 26 for holding single head fiber optic connectors. Also, the arms 22 have rough outer surfaces 221 (e.g. grooves) to facilitate gripping the holder by the user.

The body 21 has an S-shaped cross section so that the body 21 can be compressed in the lateral direction. A guarding portion 23 is formed at an end of the body 21.

Figure 5:
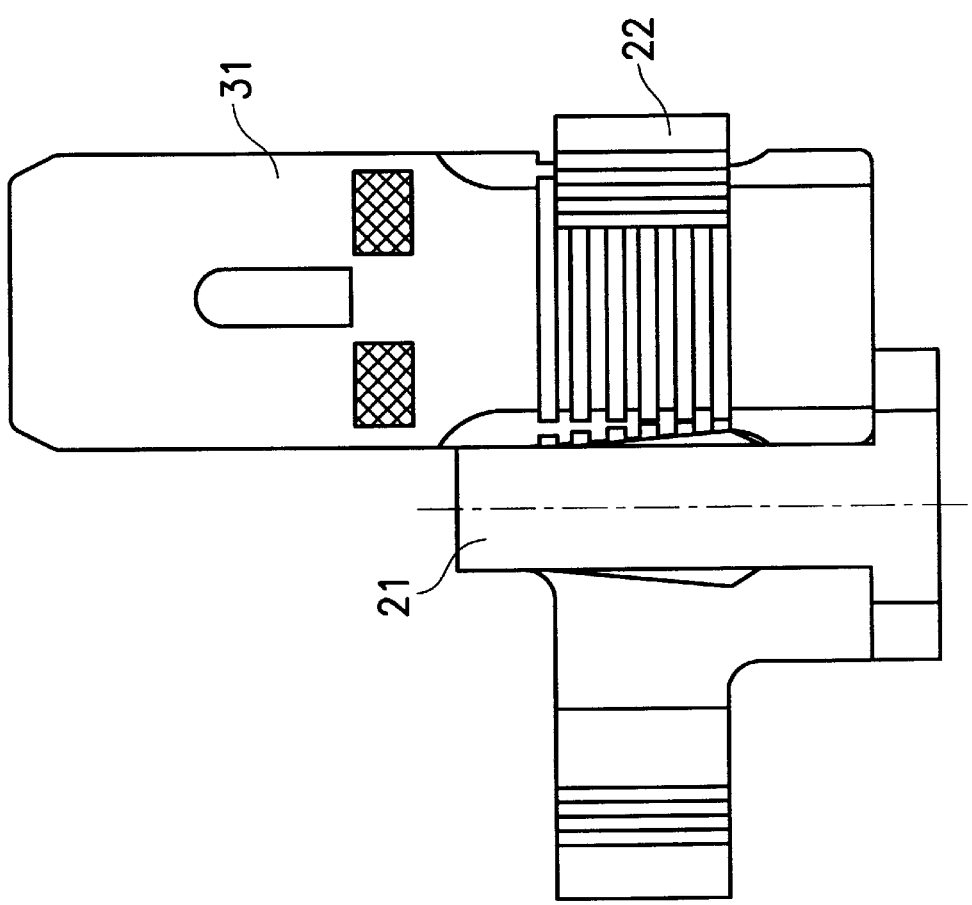
FIG. 5 is a top view according to FIG. 4 with a single head fiber optic connector held by the holder.

When the holder is in use, connectors are disposed in the receiving spaces 26 and surrounded by the body 21, the arms 22 and the guarding portion 23. The connectors are mainly held in the lateral directions by the arms 22 and the body 21. The extending arms 22 can be deformed in the lateral directions, and so can the S-shaped body 21. Such design facilitates the adjustment of the connectors to align with other connectors. FIG. 5 is a top view of the holder, wherein a connector 31 is held by an arm of the holder and, by contrast, none held by the other arm.

In the present invention, the body and arms of the holder are integrally formed. There is no need to assemble the holder. This can save a large quantity of manual labor.

Furthermore, the holder of the present invention is adapted for the connectors of normal specifications, and therefore is greatly advantageous in universality, circulation and commercial competition.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A holder for single head fiber optic connectors, comprising:

a body having a guarding portion;

a pair of arms extending from said body so as to form a pair of receiving spaces between said body and said arms;

said arms and said guarding portion defining said receiving spaces and adapted to hold said single fiber optic connectors, wherein (i) said guarding portion is adapted to hold said single head fiber optic connectors at their ends and (ii) said guarding portion is substantially I-shaped; and a plurality of first flanges and second flanges for holding said single head connectors in said receiving spaces, wherein said first flanges extend from said body to said guarding portion, and said second flanges extend from said guarding portion to said arms.

2. A holder for single head fiber optic connectors, comprising:

a body having a guarding portion;

a pair of arms extending from said body so as to form a pair of receiving spaces between said body and said arms;

said arms and said guarding portion defining said receiving spaces and adapted to hold said single fiber optic connectors, wherein (i) said guarding portion is adapted to hold said single head fiber optic connectors at their ends and (ii) said guarding portion is substantially I-shaped; and a plurality of first flanges and second flanges for holding said single head connectors in said receiving spaces, wherein said first flanges extend from said body to said guarding portion, and said second flanges extend from said guarding portion to said arms;

wherein said first flanges and said second flanges are arcuate.

* * * * *